Jan. 19, 1943. L. E. BOWMAN 2,308,487
THERMOSTATIC VALVE CONSTRUCTION
Filed Aug. 3, 1940
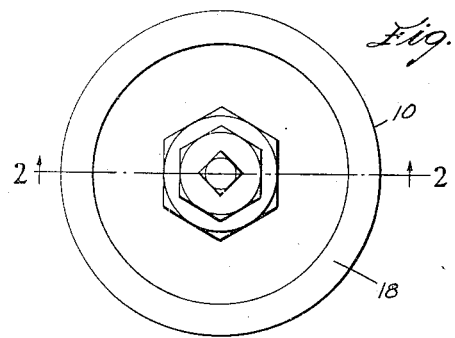
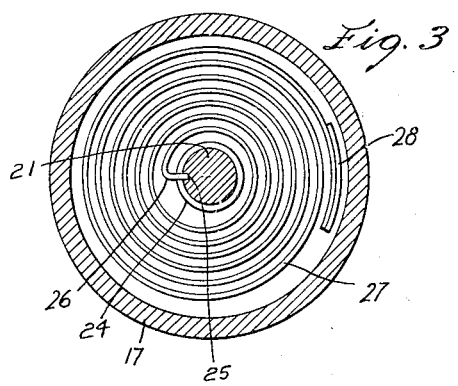
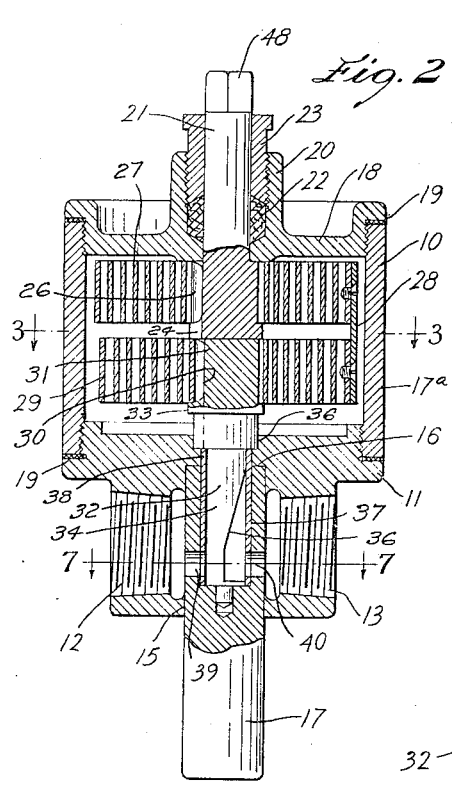
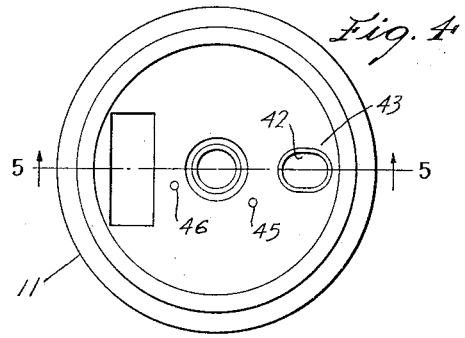
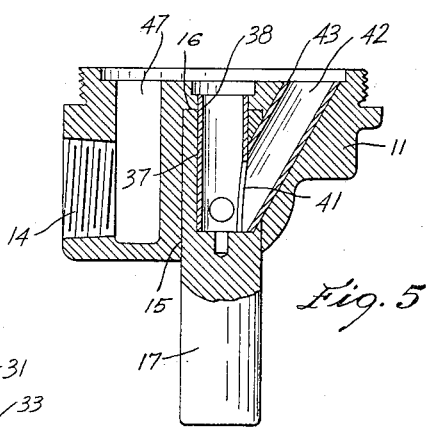
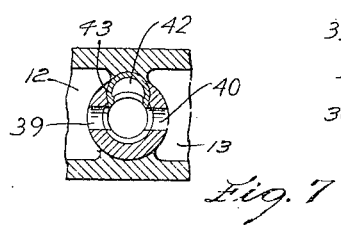
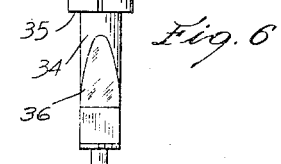
INVENTOR
Lawrence E. Bowman
BY
Nathaniel Frucht
ATTORNEY Patented Jan. 19, 1943

2,308,487

UNITED STATES PATENT OFFICE 2,308,487

THERMOSTATIC VALVE CONSTRUCTION

Lawrence E. Bowman, Auburn, R. I., assignor to Leonard Valve Company, Providence, R. I., a corporation of Rhode Island Application August 3, 1940, Serial No. 350,657

5 Claims. (Cl. 236—12)

My present invention relates to thermostatic valves, and has particular reference to a novel construction for an oscillating type valve.

It is the principal object of my invention to provide a valve construction for thermostatic valves which reduces the resistance to movement of the valve, so as to minimize the resistance to thermostatic action.

It is a further object of my invention to provide a simplified arrangement for a thermostatic valve construction of the rotary or oscillating type.

An additional object of my invention is to provide a thermostatic valve construction of small size, which is economical to manufacture and to assemble.

With the above and other objects and advantageous features in view, the invention consists of a novel arrangement of parts more fully disclosed in the detailed description following, in conjunction with the accompanying drawing, and more specifically defined in the claims appended thereto.

In the drawing:

Fig. 1 is a plan view of the valve;

Fig. 2 is a section on the line 2—2 of Fig. 1;

Fig. 3 is a section on the line 3—3 of Fig. 2;

Fig. 4 is a plan view and Fig. 5 is a vertical section of the valve base;

Fig. 6 is a side elevation of the flow control valve; and

Fig. 7 is a section on the line 7—7 of Fig. 2.

Referring to the drawing, the novel thermostatic valve 10 includes a base 11, provided with an inlet 12 for hot fluid, and aligned inlet 13 for cold fluid, and an outlet 14 for mixed fluids. The inlet and outlet are preferably internally threaded to receive pipe connections, and the base has a central bore 15 reduced at its upper end to provide shoulders 16, for receiving a tubular standard 17 which has its upper end shaped to provide a valve seat. As best shown in Fig. 2, the upper periphery of the base 11 is reduced in diameter and is threaded to receive a correspondingly threaded cylinder 17a, which is threaded at its upper end to receive a cap 18; the cap, cylinder and base provide a housing for the thermostatic mechanism. Suitable packing 19 is provided between the cap, the tube, and the base, the cap having a central upstanding annular boss 20 through which an adjustment stem 21 is provided with an annular ring 24 having a vertical slot 25, see Fig. 3, for receiving the inner inturned end 26 of a thermostatic coil 27, the outer end of the coil being connected as by means of a plate or the like 28 to the outer end of a second thermostatic coil 29, the inner end of the second thermostatic coil engaging a slot 30 in the upper portion 31 of a control valve 32 which is in the form of a circular rod, shaped as described below. The top of the valve 32 forms a bearing for the lower end of the adjustment stem 21, and the upper portion 31 has an annular ring 33, the lower portion 34 of the control valve being of smaller diameter than the upper portion to provide a shoulder 35 which sets in a corresponding recess 36 in the base 11. The lower portion 34 is generally cylindrical in shape, but is cut away to provide a reduced arcuate portion 36. Oscillating movement of the valve 32 is limited, see Figs. 4 and 6, by stop pins 45 and 46 mounted on the base 11, and a cooperating pin 44 projecting from the valve body. The standard 17 is provided with a central bore 37, see Fig. 5, aligned with a bushing 38 which extends upwardly to engage the base 11 between the shoulder 16 and recess 36, in which the lower portion 34 of the valve seats. The bushing 38, see Figs. 2 and 5, and the standard 17 are provided with aligned openings to provide inflow ports 39 and 40 and an outflow port 41 communicating with the chamber in which the thermostatic coils are housed through a conduit 42 which is preferably lined as indicated at 43.

The above-described arrangement thus includes a small number of readily manufactured and assembled parts, which function together to produce a very efficient device, the temperature of the mixed fluid shifting the valve body in accordance with variations thereof to control the relative amount of hot and cold fluids.

The operation of the improved valve may now be described. The incoming hot and cold fluids, which are usually water, flow in through the inlet openings 12 and 13 and through the port openings 39 and 40 into the central bore, the flow being controlled by oscillating movement of the arcuate lower portion 36 of the control valve. The hot and cold fluids enter the angularly disposed conduit 42 which thus forms an outflow passage or passageway through the port 41, the bevelled portion 36 of the control valve permitting this flow, and into the thermostatic chamber, where the mixed fluid contacts the two thermostatic coils, and then exits through an outlet chamber comprising a conduit 47 and the outlet 14. The valve seats either to the right or left, depending upon the changes in temperature of the mixed fluid and the resulting action of the thermostatic coil, so as to control the relative amount of hot and cold fluids and attain a predetermined temperature for the mixed fluid. A predetermined temperature is controlled by turning the adjustment stem 21, which has its upper end 48 squared to facilitate adjustment, movement of the adjustment stem setting the first thermostatic coil and therefore the second thermostatic coil so as to turn the control valve to a predetermined degree. If desired, a pointer may be fastened to the adjustment stem, to cooperate with an indicia which may be engraved on or secured to, as by means of a separate plate, to the cover 18.

The use of a reduced size control valve such as above described and illustrated renders the effect of the pressure of the hot and cold fluids negligible with respect to the operation of the control valve, as the small size of the valve reduces the pressure effect to a negligible consideration. The parts themselves are few in number, are readily assembled, and cooperate together to produce a very effective thermostatic control for obtaining mixed fluid at predetermined temperature.

While I have described a specific constructional embodiment of my invention, it is obvious that changes in the size and shape of the parts and in the use of different materials for the parts, may be made to suit the requirements for different thermostatic valve designs, without departing from the spirit and the scope of the invention as defined in the appended claims.

I claim:

1. In a mixing valve, a base, a housing mounted on said base, said base having an inlet for hot fluid, an inlet for cold fluid, and an outlet for mixed fluid, a member mounted in said base and having a bore, inlet ports in said member adjacent the lower end of said bore and communicating said bore with said inlets, said base having an angularly disposed mixed fluid passageway communicating the lower end of said bore with said housing, a rod extending into said bore and having a cut-away portion adjacent its lower end forming a flattened face for controlling the flow of fluid from said inlets into said angular passageway, and a thermostatic element mounted in said housing adapted to rotatably operate said rod in response to the mixed fluid temperature, said housing communicating with said outlet.

2. In a mixing valve, a base, a housing mounted on said base, said base having an inlet for hot fluid, an inlet for cold fluid, and an outlet chamber for mixed fluid, a member mounted in said base and having a bore, inlet ports in said member adjacent the lower end of said bore and communicating said bore with said inlets, said base having an angularly disposed mixed fluid passageway communicating the lower end of said bore with said housing, a rod rotatably mounted in said bore and having a cut-away portion adjacent its lower end forming a flattened face for controlling the flow of fluid from said inlets into said angular passageway, and a thermostatic element mounted in said housing adapted to rotatably operate said rod in response to the mixed fluid temperature, said housing communicating with said outlet chamber.

3. In a mixing valve, a base, a housing mounted on said base, said base having an inlet for hot fluid, an inlet for cold fluid, and an outlet for mixed fluid, a member mounted in said base and having a bore, inlet ports in said member adjacent the lower end of said bore and communicating said bore with said inlets, said base having an angularly disposed mixed fluid passageway communicating the lower end of said bore with said housing, a rod rotatably mounted in said bore and having a cut-away portion adjacent its lower end forming a flattened face for controlling the flow of fluid from said inlets into said angular passageway, and a pair of thermostatic coil elements mounted in said housing adapted to rotatably operate said rod in response to the mixed fluid temperature, said housing communicating with said outlet.

4. In a mixing valve, a base having an inlet for hot fluid, an inlet for cold fluid and an outlet chamber for mixed fluid, a valve seat member having a bore open at the upper end thereof and positioned in said base, port openings communicating said inlets with said bore, an outflow passage for mixed fluid in said base communicating with said bore, a valve rotatably mounted in said bore and closing the open end thereof and adapted to control communication of said port openings with said outflow passage, said valve being rotatable to simultaneously decrease flow through one inlet port opening and increase flow through the other inlet port opening, a thermostat housing on said base communicating said outflow passage with said outlet chamber, and a thermostatic device in said housing in the path of flow of fluid from said outflow passage to said outlet chamber and adapted to rotate said valve in response to changes of temperature of the mixed fluid.

5. In a mixing valve, a base having an inlet for hot fluid, an inlet for cold fluid and an outlet chamber for mixed fluid, a valve seat member having a bore open at the upper end thereof and positioned in said base, port openings communicating said inlets with said bore, an outflow passage for mixed fluid in said base communicating with said bore, a valve rotatably mounted in said bore and closing the open end thereof having a cut-away portion and adapted to control communication of said port openings with said outflow passage, said valve being rotatable to simultaneously decrease flow through one inlet port opening and increase flow through the other inlet port opening, a thermostat housing on said base communicating said outflow passage with said outlet chamber, and a thermostatic device in said housing in the path of flow of fluid from said outflow passage to said outlet chamber and adapted to rotate said valve in response to changes of temperature of the mixed fluid.

LAWRENCE E. BOWMAN.